United States Patent
Care et al.

(10) Patent No.: US 6,893,478 B2
(45) Date of Patent: May 17, 2005

(54) AIR/OIL SEPARATOR

(75) Inventors: Ian C Care, Derby (GB); Colin A Foord, Derby (GB); Alison J McMillan, Uttoxeter (GB); Michael J Mountney, Nottingham (GB)

(73) Assignee: Rolls-Royce plc, London (GB)

( * ) Notice: Subject to any disclaimer, the term of this patent is extended or adjusted under 35 U.S.C. 154(b) by 104 days.

(21) Appl. No.: 10/379,675

(22) Filed: Mar. 6, 2003

(65) Prior Publication Data

US 2004/0098956 A1 May 27, 2004

(30) Foreign Application Priority Data

Mar. 16, 2002 (GB) .............................................. 0206243

(51) Int. Cl.$^7$ .............................................. B01D 45/14
(52) U.S. Cl. ............................ 55/337; 55/401; 55/406; 96/189
(58) Field of Search ........................ 55/337, 400, 401, 55/406; 96/188, 189, 190

(56) References Cited

U.S. PATENT DOCUMENTS

| | | | |
|---|---|---|---|
| 3,561,195 A | 2/1971 | Bouru | |
| 4,049,401 A | 9/1977 | Smith | |
| 4,422,821 A | 12/1983 | Smith | |
| 4,957,517 A | 9/1990 | Linnert | |
| 4,981,502 A | 1/1991 | Gottschalk | |
| 5,716,423 A | 2/1998 | Krul et al. | |
| 5,776,229 A | * | 7/1998 | Blanes et al. .................. 96/188 |

* cited by examiner

*Primary Examiner*—Robert A. Hopkins
(74) *Attorney, Agent, or Firm*—W. Warren Taltavull; Manelli Denison & Selter PLLC

(57) ABSTRACT

An air/oil separator (40) comprises a rotor (60) and a casing (62) surrounding the rotor (60). The casing (60) has an inlet (64) at a first axial position (A) for the supply of an air and oil mixture into the air/oil separator (40). The rotor (60) has an outlet (66) for discharging cleaned air from the air/oil separator (40). The rotor (60) carries a plurality of porous members (68, 70, 72). The porous members (68, 70, 72) have an inlet (74) at a second axial position (B) and an outlet (76) at a third axial position (C). The third axial position (C) is arranged axially between the first axial position (A) and the second axial position (B). A first passage (88) supplies the air and oil mixture from the inlet (64) in the casing (62) to the inlet (74) to the porous members (68, 70, 72). A second passage (94) supplies cleaned air from the porous members (68, 70, 72) to the outlet (66) in the rotor (60). In use the air and oil mixture flows through the porous members (68, 70, 72) in the opposite direction to the air and oil mixture flowing through the first passage (88).

15 Claims, 4 Drawing Sheets

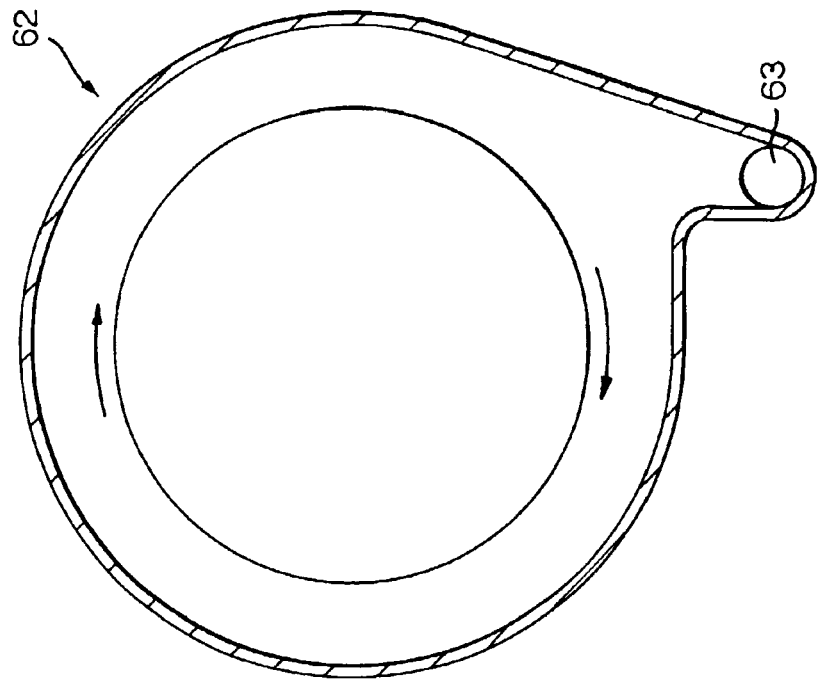
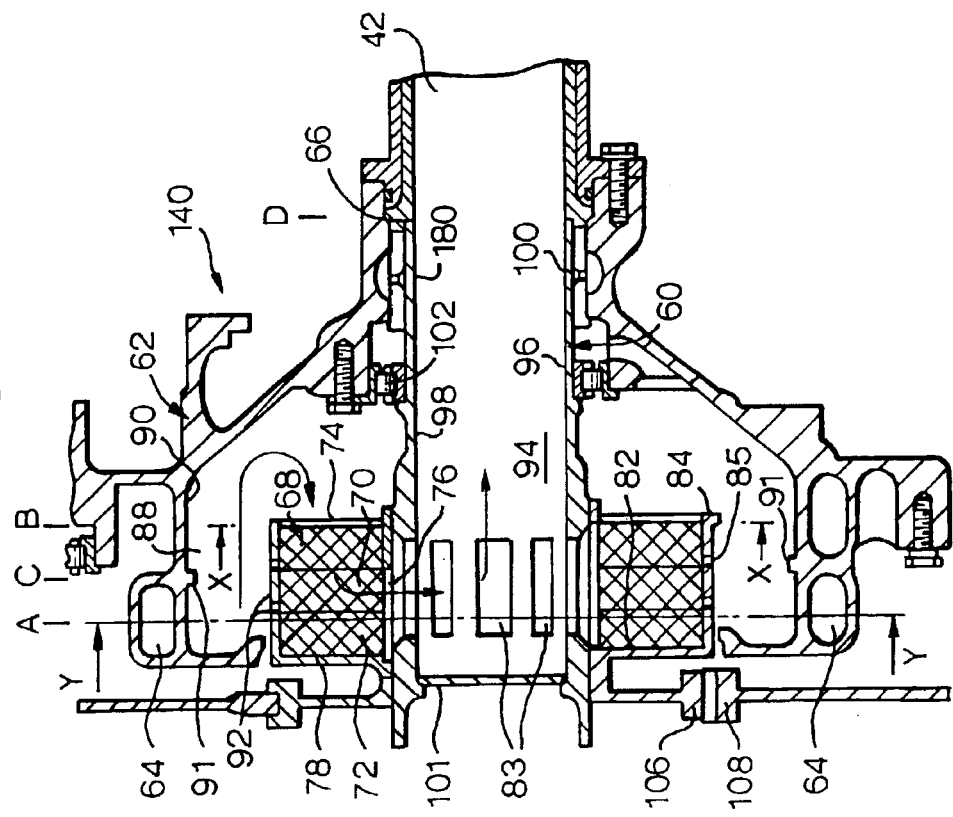

US 6,893,478 B2

AIR/OIL SEPARATOR

FIELD OF THE INVENTION

The present invention relates to an air/oil separator. The present invention relates in particular to an air/oil separator for a gas turbine engine.

BACKGROUND OF THE INVENTION

A known air/oil separator comprises a rotor, which has an inlet at a first axial end for the supply of an air and oil mixture into the air/oil separator and the rotor has an outlet at a second axial end for discharging cleaned from the air/oil separator. The rotor carries an annular porous member. The air and oil mixture flows axially through the porous member and oil is centrifuged radially outwardly from the porous member and the air flows radially inwardly to subsequently flow axially out of the air/oil separator. This arrangement is shown in our UK patent GB1508212.

A further known air/oil separator is similar to the previously mentioned one, but the air outlet is also at the first axial end of the air/oil separator. The air and oil mixture axially through the porous member and oil is centrifuged radially outwardly from the porous member and the air flows radially inwardly to subsequently flow axially out of the air/oil separator. This arrangement is shown in U.S. Pat. No. 5,716,423 and U.S. Pat. No. 6,033,450.

However, it has been found that there is still some oil discharged from the air/oil separator with the air. This leads to the undesirable emission of oil from the gas turbine engine, staining of the outer surface of the fan casing and increasing the oil consumption of the gas turbine engine.

SUMMARY OF THE INVENTION

Accordingly the present invention seeks to provide a novel air/oil separator, which reduces, preferably overcomes, the above-mentioned problems.

Accordingly the present invention provides an air/oil separator comprising a rotor and a casing surrounding the rotor, the casing having an inlet at a first axial position for the supply of an air and oil mixture into the air/oil separator, the rotor having an outlet for discharging cleaned air from the air/oil separator, the rotor carrying at least one porous member, the at least one porous member having an inlet at a second axial position and an outlet at a third axial position, the third axial position being arranged axially between the first axial position and the second axial position, means to define a first passage for the flow of the air and oil mixture axially from the inlet in the casing to the inlet to the at least one porous member, means to define a second passage for the flow of the cleaned air from the at least one porous member to the outlet in the rotor, whereby in use the air and oil mixture flowing through the at least one porous member flows in the opposite direction to the air and oil mixture flowing through the first passage.

Preferably the outlet from the rotor is at a fourth axial position, the second axial position being arranged axially between the third axial position and the fourth axial position, whereby in use the cleaned air flowing through the outlet from the rotor flows in the opposite direction to the air and oil mixture flowing through the at least one porous member.

Preferably the means to define the first passage and the means to define the second passage comprises a member surrounding the at least one porous member and spaced from the casing, the member extending axially from the second axial position to the third axial position and radially inwardly and axially from the third axial position to the first axial position.

Alternatively the means to define the first passage comprises a member surrounding the at least one porous member and spaced from the casing, the member extending axially from the second axial position to the first axial position.

Preferably the member comprises a frustoconical portion and a cylindrical portion.

Preferably the inlet is arranged to direct the air and oil mixture tangentially into the air/oil separator.

Preferably the inlet has means to swirl the air and oil mixture before the air and oil mixture enters the air/oil separator.

Preferably the means to swirl the air and oil mixture comprises a pipe having a first bend and a second bend.

Preferably the casing has an inner surface, the inner surface comprises a layer of a porous material.

Preferably the porous material is a porous metal matrix.

Preferably the at least one porous member comprises a plurality of porous members arranged in flow series.

Preferably the porous members have different porosities.

Preferably the porous member with finest porosity is at the inlet of the at least one porous member and the porous member with the coarsest porosity is at the outlet of the at least one porous member.

Preferably the at least one porous member is a porous metal matrix.

Preferably the at least one porous member is annular, the first passage is annular and the second passage is annular.

BRIEF DESCRIPTION OF THE DRAWINGS

The present invention will be more fully described by way of example with reference to the accompanying drawings in which:

FIG. 5 is an alternative enlarged longitudinal cross-sectional view through the air/oil separator shown in FIG. 1.

FIG. 6 is a cross-section along line X—X of FIG. 5.

DETAILED DESCRIPTION OF THE INVENTION

Figure 1:
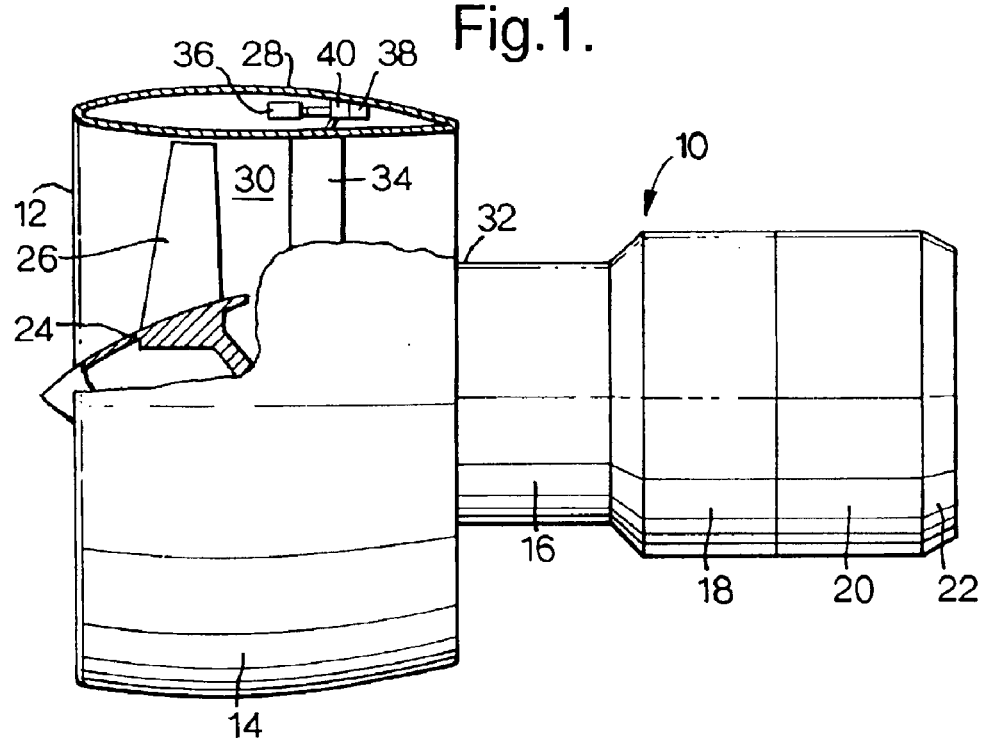
FIG. 1 shows a turbofan gas turbine engine having an air/oil separator according to the present invention.

A turbofan gas turbine engine 10, as shown in FIG. 1, comprises an inlet 12, a fan section 14, a compressor section 16, a combustion section 18, a turbine section 20 and an exhaust 22. The fan section 14 comprises a fan rotor 24 carrying a plurality of circumferentially spaced, radially outwardly extending fan blades 26. A fan casing 28 encloses the fan blades 26. The fan casing 28 partially defines a fan duct, or bypass duct, 30 and the fan casing 28 is supported from a core casing 32 by a plurality of circumferentially spaced radially extending fan outlet guide vanes 34. The operation of the gas turbine engine 10 is quite conventional and this will not be discussed further.

The turbofan gas turbine engine 10 has accessories 36, a gearbox 38 and an air/oil separator 40 mounted within the fan casing 28, as shown in FIG. 1. The gearbox 38 is arranged to drive the accessories 36 and the air/oil separator 40. The air/oil separator 40 has a breather outlet 42. The air/oil separator 40 forms part of a lubrication system 43.

Figure 2:
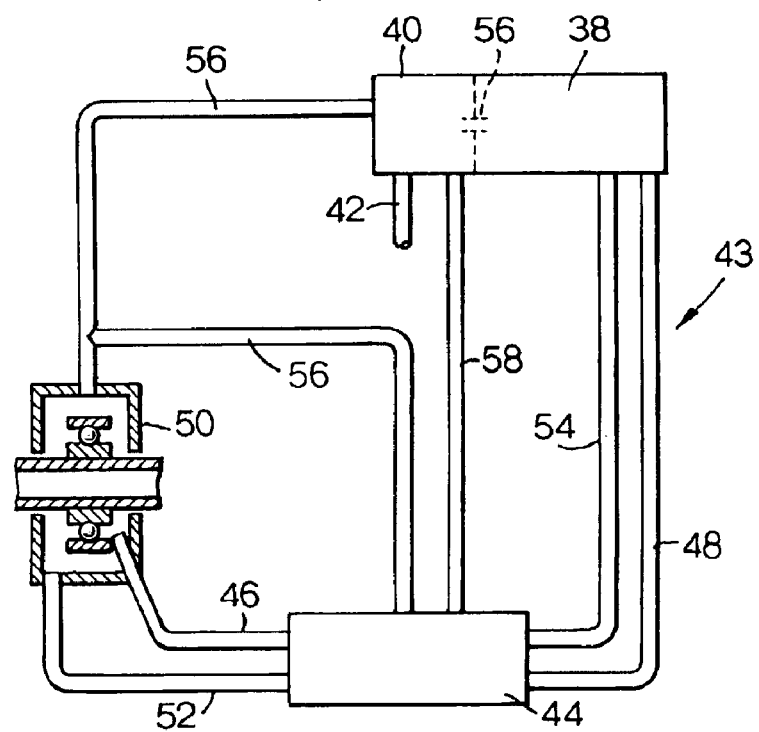
FIG. 2 is a diagrammatic diagram of the lubrication system of the turbofan gas turbine engine shown in FIG. 1.

The lubrication system 43, as shown in FIG. 2, comprises a lubricant tank 44, pipes 46 and 48 arranged to supply lubricant to bearings 50 and the gearbox 38 respectively, pipes 52 and 54 to return lubricant from the bearings 50 and gearbox 38 respectively to the lubricant tank 44 and vent pipes 56 to prevent over pressurisation of the bearings 50, gearbox 38 and lubricant tank 44. The vent pipes 56 supply the air, and some oil, to the air/oil separator 40. The air/oil separator 40 comprises a centrifugal separator, which is arranged to separate lubricant from the air removed from the lubrication system 43. The air/oil separator 40 returns the separated lubricant to the lubricant tank 44 via the pipe 58 and discharges air from the lubrication system 43 through the breather outlet 42. However, because the air/oil separator 40 is not 100% efficient some lubricant remains in the air and is discharged from the breather outlet 42 with the air as a lubricant and air mist.

Figure 3:
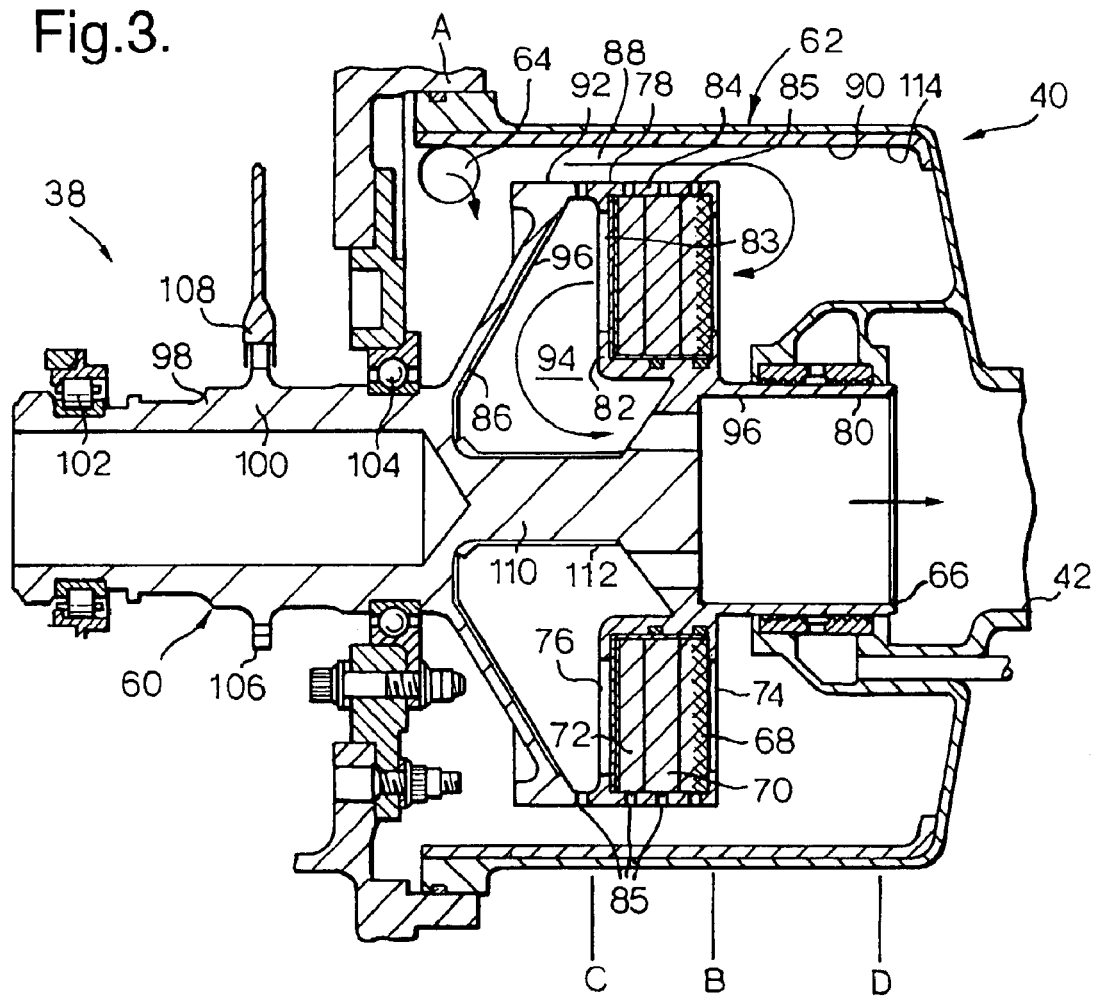
FIG. 3 is an enlarged longitudinal cross-sectional view through the air/oil separator shown in FIG. 1.

The air/oil separator 40 is shown more clearly in FIG. 3. The air/oil separator 40 comprises a rotor 60 and a casing 62 surrounding the rotor 60. The casing 62 has an inlet 64 at a first axial position A for the supply of an air and oil mixture into the air/oil separator 40. The inlet 64 is supplied with an air and oil mixture by the vent pipe 56. The rotor 60 has an outlet 66 for discharging cleaned air from the air/oil separator 40. The rotor 60 carries a plurality of porous members 68, 70 and 72. The porous members have an inlet 74 at a second axial position B and an outlet 76 at a third axial position C. The third axial position C is arranged axially between the first axial position A and the second axial position B. The outlet from the rotor 60 is at a fourth axial position D.

The rotor 60 comprises a member 78 extending axially from the fourth axial position D to the third axial position B, radially at the third axial position C, axially from the third axial position C to the second axial position B and extending axially and radially inwardly from the third axial position C to the first axial position A. Thus the member 78 comprises an inner cylindrical portion 80, a radial portion 82, an outer cylindrical portion 84 and a frustoconical portion 86. The outer cylindrical portion 84 has a greater diameter than the inner cylindrical portion 80. The outer cylindrical portion 84 of the member 78 surrounds the porous members 68, 70 and 72 and is spaced radially from the casing 62. The outer cylindrical portion 84 of the member 78 has a plurality of apertures 85 extending radially therethrough. The radial portion 82 has a plurality of apertures 83 extending axially therethrough. The porous members 68, 70 and 72 abut the face of the radial portion 82 and surround the inner cylindrical portion 80.

A first annular passage 88 for the flow of the air and oil mixture axially from the inlet 64 in the casing 62 to the inlet 74 to the porous members 68, 70 and 72 is defined between an inner surface 90 of the casing 62 and an outer surface 92 of the cylindrical portion 84 of the member 78. A second passage 94 for the flow of the cleaned air from the outlet 76 of the porous members 68, 70 and 72 to the outlet 66 in the rotor 60 is partially defined by an inner surface 96 of the member 78.

The radially inner end of the frustoconical portion 86 of the member 78 is secured to a shaft 98. The shaft 98 comprises a first portion 100, which is rotatably mounted in the casing 62 by axially spaced bearings 102 and 104. The first portion 100 includes a sun gear 106, which meshes with and is driven by a gear 108. The shaft 98 includes a cylindrical member 110, which has an outer surface 112. The cylindrical member 110 extends axially within the member 78 such that the outer surface partially defines the second passage 94.

The inlet 64 is arranged to supply the air and oil mixture tangentially into the casing 60. The inner surface 90 of the casing 60 comprises a layer of a porous material 114. The porous material is a porous metal matrix.

The porous members 68, 70 and 72 have different porosities. In particular the porous member 68 with least porosity is at the inlet 74 and the porous member 72 with the greatest porosity is at the outlet 76. The porous member 72 has more pores per cm than the porous member 76, but the porous member 72 has a greater resistance to flow than the porous member 76. The porous member 74 has porosity and resistance to flow intermediate that of the porous members 72 and 76. The porous members 68, 70 and 72 comprise a porous metal matrix, for example as sold under the Registered Trade Mark Retimet by Dunlop Ltd.

In use the gear 108 drives the rotor 60 of the air/oil separator 40 and an air and oil mixture is supplied tangentially into the air/oil separator 40 to form a swirling flow in the first annular passage 88. The air and oil mixture flows axially through the first annular passage 88 from the inlet 64 at the first axial position A to the inlet 74 to the porous members 68, 70 and 72 at the second axial position B. The air and oil mixture then turns through substantially 180° to flow through the inlet 74 to the porous members 68, 70 and 72. The air and oil mixture flows through the porous members 68, 70 and 72, and the cleaned air flows axially through the apertures 83. The porous members 68, 70 and 72 remove oil from the air and oil mixture and the cleaned air flows through the outlet 76 of the porous members 68, 70 and 72 into the second passage 94 at the third axial position C. The cleaned air flow turns through substantially 180° in the second passage 94 to flow to the outlet 66 at the fourth axial position D.

Thus it can be seen that the air and oil mixture flows through the porous members 68, 70 and 72 in the opposite direction to the flow of the air and oil mixture through the first annular passage 88. The cleaned air flows through the outlet 66 from the rotor 60 in the opposite direction to the flow of the air and oil mixture flowing through the porous members 68, 70 and 72.

Some of the oil is removed from the air and oil mixture due to the centrifugal action of the swirling air and oil flowing in the first annular passage 88 causing the heavier drops of oil to be flung radially outwardly onto the inner surface 90 of the casing 62. Some of the oil is removed from the air and oil mixture due to the swirling air and oil flow turning through 180° from the first annular passage 88 to the inlet 74 to porous members 68, 70 and 72 causing the heavier oil drops to be flung radially outwardly and/or axially onto the inner surface 90 of the casing 62.

The oil is removed from the air and oil mixture by centrifugal action on the air and oil mixture in the porous members 68, 70 and 72. The heavier drops of oil are flung radially outwardly to collect on the radially inner surface of the cylindrical portion 84, the oil drops flow through the apertures 85 and then the oil drops are flung onto the porous material 114 on the inner surface 90 of the casing 62. The oil drops are collected in the porous material 114 on the inner surface 90 of the casing 90 and flow under gravity and air pressure to the oil scavenge (not shown). The porous material 114 forms a barrier such that the flow of air cannot remove the oil drops from the inner surface 90 of the casing 62 back into the air flow.

Any oil remaining after the air has passed through the porous members 68, 70 and 72 is removed from the air due to the swirling air and oil flow turning through 180° from the porous members 68, 70 and 72 through the second passage 94 to the outlet 66. This turning of the air and oil flow causes the heavier oil drops to be flung radially outwardly and/or axially onto the inner surface 96 of the frustoconical portion 90 of the member 78. The oil then flows along the inner surface 96 and is flung radially outwardly through the apertures 85 onto the porous material 11 on the inner surface 90 of the casing 62.

The porous members 68, 70 and 72 allow the air/oil separator 40 to cater for smaller sizes of oil drop compared to the prior art whilst keeping the working pressure drop to a minimum. The majority of the separation of the oil drops from the air and oil mixture occurs at the inlet 74 to the porous members 68, 70 and 72. This indicates that the finest porous member 68 is arranged at the inlet 74 and the coarsest porous member 72 is arranged at the outlet 76. A pressure drop at the inlet 74 to the porous members 68, 70 and 72 reduces the speed of the oil and air mixture and hence allows the oil droplets to coalesce more easily in the porous members 68, 70 and 72.

Figure 4:
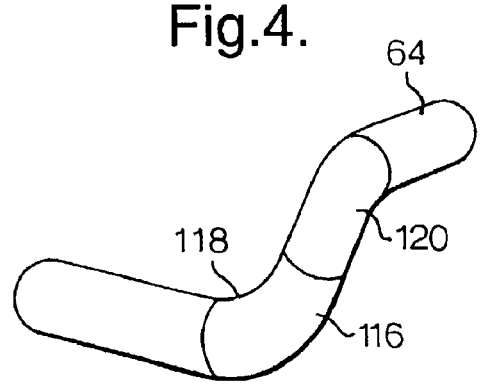
FIG. 4 is an enlarged view of an inlet pipe for the air/oil separator shown in FIG. 1.

The air and oil separation at entry to the air/oil separator 40 is improved by passively swirling the air and oil mixture at entry to the air/oil separator 40, as shown in FIG. 4. This allows larger drops of oil to be separated onto the walls of an entry pipe 116 and to flow along the walls of the entry pipe 116 to enter the air/oil separator 40. The pipe 116 comprises a first bend 118 and a second bend 120 spaced apart by a distance less than seven pipe diameters in the direction of flow. The first and second bends 118 and 120 are substantially 60° or greater bends and the first and second bends 118 and 120 are arranged at 90° to each other. The slow moving fluid moves to the inside of the first bend 118 and then moves to the inside of the second bend 120 by the shortest route. The inlet 64 to the air/oil chamber 40 is arranged to be tangential to the casing 62, because this is best.

Figure 7:
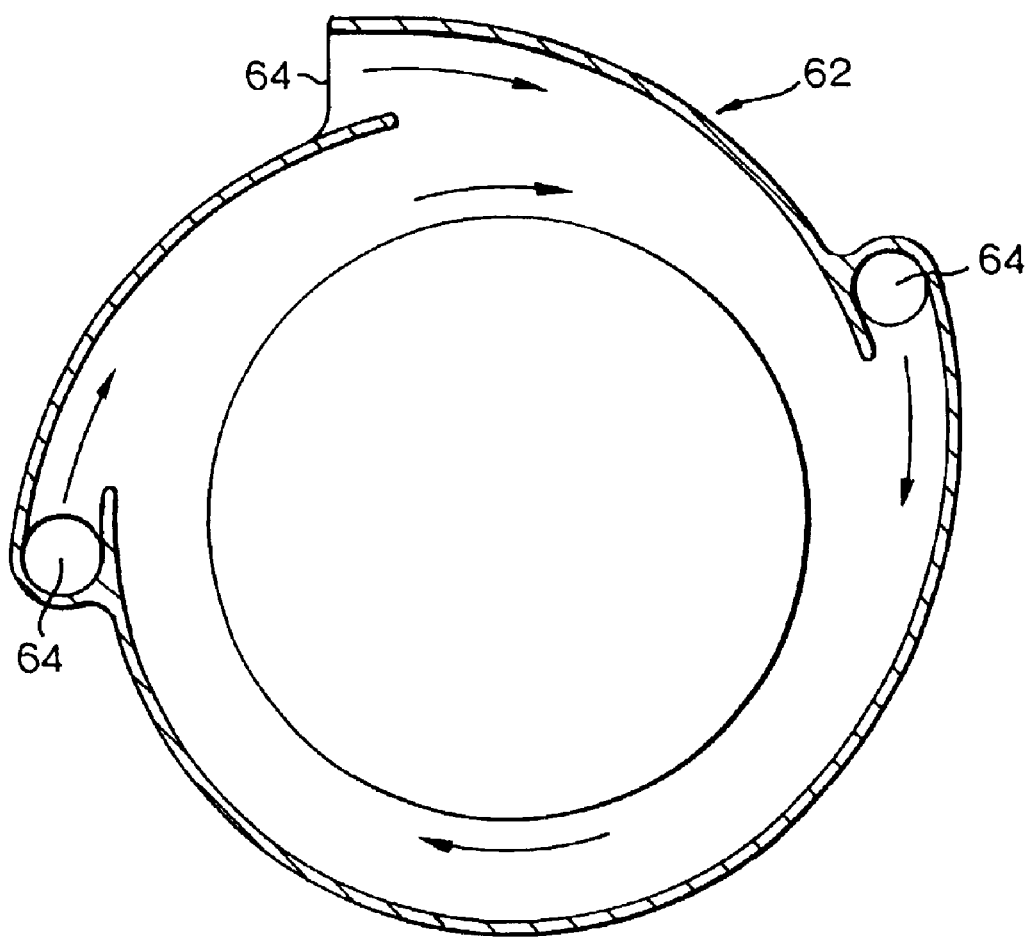
FIG. 7 is a cross-section along line Y—Y of FIG. 5.

A further air/oil separator 140 according to the present invention is shown in FIGS. 5, 6 and 7. The air/oil separator 140 is similar to the air/oil separator 40 shown in FIG. 3.

The rotor 60 comprises a member 78, which comprises a cylindrical portion 80, a radial portion 82 and a cylindrical portion 84. The cylindrical portion 84 has a greater diameter than the cylindrical portion 80. The cylindrical portion 84 of the member 78 surrounds the porous members 68, 70 and 72 and is spaced radially from the casing 62. The cylindrical portion 84 of the member 78 has a plurality of apertures 85 extending radially therethrough. The radial portion 82 does not have a plurality of apertures extending axially therethrough, instead the cylindrical portion 80 has a plurality of apertures 83 extending radially therethrough. The porous members 68, 70 and 72 abut the face of the radial portion 82 and surround the cylindrical portion 80. The cylindrical portion 80 forms at least a part of the shaft 98.

A first annular passage 88 for the flow of the air and oil mixture axially from the inlet 64 in the casing 62 to the inlet 74 to the porous members 68, 70 and 72 is defined between an inner surface 90 of the casing 62 and an outer surface 92 of the cylindrical portion 84 of the member 78. A second passage 94 for the flow of the cleaned air from the outlet 76 of the porous members 68, 70 and 72 to the outlet 66 in the rotor 60 is partially defined by an inner surface 96 of the member 78.

The shaft 98 is rotatably mounted in the casing 62 by two bearings, only bearing 102 is shown. The shaft 98 includes a sun gear 106, which meshes with and is driven by a gear 108.

In use the gear 108 drives the rotor 60 of the air/oil separator 40 and an air and oil mixture is supplied tangentially into the air/oil separator 40 to form a swirling flow in the first annular passage 88. The air and oil mixture flows axially through the first annular passage 88 from the inlet 64 at the first axial position A to the inlet 74 to the porous members 68, 70 and 72 at the second axial position B. The air and oil mixture then turns through substantially 180° to flow through the inlet 74 to the porous members 68, 70 and 72. The air and oil mixture flows through the porous members 68, 70 and 72, and the cleaned air flows radially through the apertures 83. The porous members 68, 70 and 72 remove oil from the air and oil mixture and the cleaned air flows through the outlet 76 of the porous members 68, 70 and 72 into the second passage 94 at the third axial position C. The cleaned air flow turns through substantially 180° into the second passage 94 to flow to the outlet 66 at the fourth axial position D.

Thus it can be seen that the air and oil mixture flows through the porous members 68, 70 and 72 in the opposite direction to the flow of the air and oil mixture through the first annular passage 88. The cleaned air flows through the outlet 66 from the rotor 60 in the opposite direction to the flow of the air and oil mixture flowing through the porous members 68, 70 and 72.

Some of the oil is removed from the air and oil mixture due to the centrifugal action of the swirling air and oil flowing in the first annular passage 88 causing the heavier drops of oil to be flung radially outwardly onto the inner surface 90 of the casing 62. Some of the oil is removed from the air and oil mixture due to the swirling air and oil flow turning through 180° from the first annular passage 88 to the inlet 74 to porous members 68, 70 and 72 causing the heavier oil drops to be flung radially outwardly and/or axially onto the inner surface 90 of the casing 62. The oil is driven towards the outlet 63 by the swirling air flow and a scroll 91 on the inner surface 90 of the casing 62.

The oil is removed from the air and oil mixture by centrifugal action on the air and oil mixture in the porous members 68, 70 and 72. The heavier drops of oil are flung radially outwardly to collect on the radially inner surface of the cylindrical portion 84, the oil drops flow through the apertures 85 and then the oil drops are flung onto the inner surface 90 of the casing 62. The oil drops on the inner surface 90 of the casing 90 and flow under gravity and air pressure from the swirling air and are directed by the scroll 91 to the oil scavenge outlet pipe 63.

Additionally oil flowing through the porous members 68, 70 and 72 is removed from the air mixture due to the swirling air and oil flow turning through 180° from the porous members 68, 70 and 72 through the second passage 94 to the outlet 66 causing the heavier oil drops to be flung radially outwardly and/or axially onto the inner surfaces of the cylindrical portion 84 and the radial portion 82 of the member 78.

The air/oil separator has greater efficiency than existing designs and this leads to a reduction in oil consumption, a reduction in environmental pollution and a reduction in staining to the outer surface of the fan casing. Additionally the air/oil separator is lighter and stronger than existing designs and the air/oil separator is incorporated within the gearbox 38 casing.

What is claimed is:

1. An air/oil separator comprising a rotor and a casing surrounding the rotor, the casing having an inlet at a first axial position for supply of an air and oil mixture into the air/oil separator, the rotor having an outlet for discharging cleaned air from the air/oil separator, the rotor carrying at least one porous member, the at least one porous member having an inlet at a second axial position and an outlet at a third axial position, the third axial position being arranged axially between the first axial position and the second axial position, means to define a first passage for the flow of the air and oil mixture axially from the inlet in the casing to the inlet to the at least one porous member, means to define a second passage for the flow of the cleaned air from the at least one porous member to the outlet in the rotor, whereby in use the air and oil mixture flowing through the at least one porous member flows in the opposite direction to the air and oil mixture flowing through the first passage.

2. An airfoil separator as claimed in claim 1 wherein the outlet from the rotor is at a fourth axial position, the second axial position being arranged axially between the third axial position and the fourth axial position, whereby in use the cleaned air flowing through the outlet from the rotor flows in the opposite direction to the air and oil mixture flowing through the at least one porous member.

3. An air/oil separator as claimed in claim 1 wherein the means to define the first passage and the means to define the second passage comprises a member surrounding the at least one porous member and spaced from the casing, the member extending axially from the second axial position to the third axial position and radially inwardly and axially from the third axial position to the first axial position.

4. An air/oil separator as claimed in claim 1 wherein the means to define the first passage comprises a member surrounding the at least one porous member and spaced from the casing, the member extending axially from the second axial position to the first axial position.

5. An air/oil separator as claimed in claim 1 wherein the inlet is arranged to direct the air and oil mixture tangentially into the air/oil separator.

6. An air/oil separator as claimed in claim 1 wherein the inlet has means to swirl the air and oil mixture before the air and oil mixture enters the air/oil separator.

7. An air/oil separator as claimed in claim 6 wherein the means to swirl the air and oil mixture comprises a pipe having a first bend and a second bend.

8. An air/oil separator as claimed in claim 1 wherein the casing has an inner surface, the inner surface comprising a layer of a porous material.

9. An air/oil separator as claimed in claim 8 wherein the porous material is a porous metal matrix.

10. An air/oil separator as claimed in claim 1 comprising a plurality of porous member arranged in flow series.

11. An air/oil separator as claimed in claim 10 wherein the porous members have different porosities.

12. An air/oil separator as claimed in claim 11 wherein the porous member with the finest porosity is at the inlet of the at least one porous member and the porous member with the coarsest porosity is at the outlet of the at least one porous member.

13. An air/oil separator as claimed in claim 1 wherein the at least one porous member is a porous metal matrix.

14. An air/oil separator as claimed in claim 1 wherein the at least one porous member is annular, the first passage is annular in the second passage is annular.

15. An air/oil separator comprising a rotor and a casing surrounding the rotor, the casing having an inlet at a first axial position for supply of an air and oil mixture into the air/oil separator, the rotor having an outlet for discharging cleaned air from the air/oil separator, the rotor carrying at least one porous member, the at least one porous member having an inlet at a second axial position and an outlet at a third axial position, the third axial position being arranged axially between the first axial position and the second axial position, means to define a first passage for the flow of the air and oil mixture axially from the inlet in the casing to the inlet to the at least one porous member, means to define a second passage for the flow of the cleaned air from the at least one porous member to the outlet in the rotor, whereby in use the air and oil mixture flowing through the at least one porous member flows in the opposite direction to the air and oil mixture flowing through the first passage and wherein the means to define the first passage and the means to define the second passage comprises a member surrounding the at least one porous member and spaced from the casing, the member extending axially from the second axial position to the third axial position and radially inwardly and axially from the third axial position to the first axial position and wherein the member comprises a frustoconical portion and a cylindrical portion.

* * * * *